United States Patent
Chen et al.

(10) Patent No.: US 8,825,390 B2
(45) Date of Patent: Sep. 2, 2014

(54) NAVIGATION DEVICE AND NAVIGATION METHOD CAPABLE OF PRESENTING PROMPT INFORMATION WITH DIFFERENT LIGHT EFFECTS

(71) Applicant: Wistron Corporation, New Taipei (TW)

(72) Inventors: Chin-Hua Chen, New Taipei (TW); Ching-Yuan Chuang, New Taipei (TW); Hui-Ju Lin, New Taipei (TW); Chien-Chi Shen, New Taipei (TW); Wei-Chu Chen, New Taipei (TW); I-Tan Su, New Taipei (TW); Yu-Fang Chen, New Taipei (TW); Hung-Yang Hsu, New Taipei (TW); Chia-Chih Chen, New Taipei (TW); Cheng-Lan Lee, New Taipei (TW); Pei-Chen Chin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/847,492

(22) Filed: Mar. 20, 2013

(65) Prior Publication Data
US 2013/0325324 A1 Dec. 5, 2013

(30) Foreign Application Priority Data

Jun. 5, 2012 (TW) .............................. 101120126 A

(51) Int. Cl.
*G01C 21/34* (2006.01)
*G08G 1/0969* (2006.01)
*G01C 21/36* (2006.01)
*G08G 1/0968* (2006.01)

(52) U.S. Cl.
CPC .......... *G01C 21/3626* (2013.01); *G08G 1/0969* (2013.01); *G01C 21/3632* (2013.01); *G08G 1/096855* (2013.01)

USPC ................. 701/439; 340/995.13; 340/995.27

(58) Field of Classification Search
CPC .......... G08G 1/0969; G08G 1/096855; G08G 1/0962; G08G 1/0968; G01C 21/3697; G01C 21/3632; G01C 21/3626
See application file for complete search history.

(56) References Cited

U.S. PATENT DOCUMENTS

| 5,938,718 A * | 8/1999 | Morimoto et al. ............ 701/431 |
| 6,405,131 B1 * | 6/2002 | Barton .......................... 701/408 |

(Continued)

FOREIGN PATENT DOCUMENTS

| TW | 200942782 | 10/2009 |
| TW | M415294 | 11/2011 |

OTHER PUBLICATIONS

Office action mailed on Feb. 20, 2014 for the Taiwan application No. 101120126, filing date: Jun. 5, 2012, p. 1 line 11~14, p. 2 and p. 3 line 1~17 and line 21~22.

*Primary Examiner* — Michael J Zanelli
(74) *Attorney, Agent, or Firm* — Winston Hsu; Scott Margo

(57) ABSTRACT

The present disclosure discloses a navigation device and a navigation method. The navigation method includes a satellite signal receiving module of the navigation device for receiving a positioning signal, a control unit of the navigation device for controlling a display module to display a navigation map on a map region according to the positioning signal, and the control unit of the navigation device for controlling a prompt region to present prompt information with different light effects according to traffic information. The prompt region is located outside the map region. Therefore, it is unnecessary for the user to further pay too much cognitive attention on understanding or referring to the navigation images and instructions, so the driving safety can be ensured.

22 Claims, 8 Drawing Sheets

(56) References Cited

U.S. PATENT DOCUMENTS

| | | | |
|---|---|---|---|
| 7,212,812 B2* | 5/2007 | Park | 455/415 |
| 2008/0234932 A1* | 9/2008 | Lee | 701/213 |
| 2009/0259398 A1 | 10/2009 | Wang | |
| 2010/0250113 A1 | 9/2010 | Miyata | |
| 2010/0292924 A1* | 11/2010 | Kato | 701/211 |
| 2010/0292925 A1* | 11/2010 | Hsu | 701/213 |
| 2011/0022295 A1 | 1/2011 | Lee | |
| 2012/0005180 A1 | 1/2012 | Chen | |

* cited by examiner

NAVIGATION DEVICE AND NAVIGATION METHOD CAPABLE OF PRESENTING PROMPT INFORMATION WITH DIFFERENT LIGHT EFFECTS

BACKGROUND OF THE INVENTION

1. Field of the Invention

The present disclosure relates to a navigation device and a navigation method, and especially relates to a navigation device and a navigation method capable of presenting prompt information with different light effects.

2. Description of the Prior Art

Regarding applications for current navigation devices, during a navigation process, turning prompts and specific event notices are usually presented by icons displayed in a map region provided by the navigation device cooperating with auxiliary voice for prompting drivers. However, much information such as current position, road speed limit, real-time traffic, turning notice, velocity of vehicle and so on is presented within the map region. Besides, the information marks a navigation map in numbers, texts, icons, and specific colors. If the size of the screen of the navigation device is limited to a certain extent, it is difficult for drivers to receive and discern in time too much information presented on the screen. Furthermore, because of safety requirement of driving, the driver cannot visually concentrate on texts and icons on the navigation map displayed on the screen too long, or driving safety will be influenced. In addition, driving needs much attention. If there is interference of other voices outside or inside the car, such as human voices, sounds, external noises and so on, the driver often neglects voice prompts for turning, leading to missing important intersections or to failing to react in time to voice notices for specific events. Hence, the above current navigation devices are not designed under consideration to humanity.

SUMMARY OF THE INVENTION

The present disclosure provides a navigation device and a navigation method capable of presenting prompt information with different light effects for solving above drawbacks.

According to the claimed disclosure, a method for presenting prompt information on a navigation device is disclosed. The method includes a satellite signal receiving module of the navigation device receiving a positioning signal; a control unit of the navigation device controlling a display module of the navigation device to display a navigation map on a map region of the display module according to the positioning signal; and the control unit of the navigation device controlling a prompt region to present prompt information with different light effects according to traffic information. Therein, the prompt region is located outside the map region.

According to the claimed disclosure, the traffic information corresponds to guidance information about navigation route, information about navigation event, or prompt information about navigation ending.

According to the claimed disclosure, the control unit of the navigation device controlling the prompt region to present the prompt information with different light effects according to the traffic information includes the control unit of the navigation device controlling the prompt region to emit light in different color lights, in different flashing frequencies, or in different presenting ratios according to the guidance information about navigation route, so as to present a distance from a current position of the navigation device to a next turn planned by a navigation route.

According to the claimed disclosure, the control unit of the navigation device controls the prompt region to emit light in different arrow directions or in different presenting positions according the guidance information about navigation route, so as to present a turn direction of a next turn planned by a navigation route.

According to the claimed disclosure, the control unit of the navigation device controlling the prompt region to present the prompt information with different light effects according to the traffic information includes the control unit of the navigation device controlling the prompt region to emit light in a specific color light or in a specific flashing frequency according to the information about navigation event, so as to present a speed camera event.

According to the claimed disclosure, the control unit of the navigation device controlling the prompt region to present the prompt information with different light effects according to the traffic information includes the control unit of the navigation device controlling the prompt region to emit light in a specific color light or in a specific flashing frequency according to the prompt information about navigation ending, so as to present a current position of the navigation device being close to an end of a navigation route.

According to the claimed disclosure, a traffic information receiving unit of the navigation device receives the traffic information. The traffic information corresponds to navigation route real-time traffic information or information about navigation event.

According to the claimed disclosure, the traffic information receiving unit of the navigation device receiving the traffic information includes the traffic information receiving unit of the navigation device receiving the traffic information by a radio data system-traffic message channel or by network transmission.

According to the claimed disclosure, the control unit of the navigation device controlling the prompt region to present the prompt information with different light effects according to the traffic information includes the control unit of the navigation device controlling the prompt region to emit light in different color lights according to the navigation route real-time traffic information, so as to present a real-time traffic of a navigation route.

According to the claimed disclosure, the control unit of the navigation device controlling the prompt region to present the prompt information with different light effects according to the traffic information includes the control unit of the navigation device controlling the prompt region to emit light in a specific color light or in a specific flashing frequency according to the information about navigation event, so as to present a real-time traffic accident.

According to the claimed disclosure, the control unit of the navigation device controlling the prompt region to present the prompt information with different light effects according to the traffic information includes the control unit of the navigation device controlling by hardware the prompt region, located on a border of the navigation device outside the display module, to present the prompt information with different light effects according to the traffic information.

According to the claimed disclosure, the control unit of the navigation device controlling the prompt region to present the prompt information with different light effects according to the traffic information includes the control unit of the navigation device controlling the display module to display the prompt region by software in an edge of the map region to present the prompt information with different light effects according to the traffic information.

According to the claimed disclosure, a navigation device capable of presenting prompt information with different light effects is disclosed. The navigation device includes a satellite signal receiving module for receiving a positioning signal; a data storage unit for storing a navigation map and a navigation application program corresponding to the positioning signal; a display module for displaying the navigation map on a map region; a prompt region located outside the map region for presenting prompt information with different light effects; and a control unit coupled to the satellite signal receiving module, the data storage unit, the display module, and the prompt region, the control unit being used for controlling the display module to display the navigation map on the map region according to the positioning signal received by the satellite signal receiving module and the navigation application program and for controlling the prompt region to present the prompt information with different light effects according to the traffic information.

According to the claimed disclosure, the control unit is used for controlling the prompt region to emit light in different color lights, in different flashing frequencies, or in different presenting ratios according to the guidance information about navigation route, so as to present a distance from a current position of the navigation device to a next turn of a navigation route planned by the navigation application program.

According to the claimed disclosure, the control unit is used for controlling the prompt region to emit light in different arrow directions or in different presenting positions according the guidance information about navigation route, so as to present a turn direction of a next turn of a navigation route planned by the navigation application program.

According to the claimed disclosure, the control unit is used for controlling the prompt region to emit light in a specific color light or in a specific flashing frequency according to the information about navigation event, so as to present a speed camera event provided by the navigation application program.

According to the claimed disclosure, the control unit is used for controlling the prompt region to emit light in a specific color light or in a specific flashing frequency according to the prompt information about navigation ending, so as to present a current position of the navigation device being close to an end of a navigation route by the navigation application program.

According to the claimed disclosure, the navigation device further includes a traffic information receiving unit coupled to the control unit for receiving the traffic information. The traffic information corresponds to navigation route real-time traffic information or information about navigation event.

According to the claimed disclosure, the traffic information receiving unit receives the traffic information comprises by a radio data system-traffic message channel or by network transmission.

According to the claimed disclosure, the control unit is used for controlling the prompt region to present the prompt information with different light effects according to the navigation route real-time traffic information, so as to present a real-time traffic of a navigation route planned by the navigation application program.

According to the claimed disclosure, the control unit is used for controlling the prompt region to emit light in a specific color light or in a specific flashing frequency according to the information about navigation event, so as to present a real-time traffic accident.

According to the claimed disclosure, the navigation device further includes a border disposed outside the display module; and at least one light source installed in the border and coupled to the control unit for forming the prompt region. The control unit controls the at least one light source to present the prompt information with different light effects.

According to the claimed disclosure, the control unit is used for controlling the display module to display the prompt region by software in an edge of the map region.

The present disclosure provides a navigation device and a navigation method capable of presenting prompt information with different light effects. For example, the prompt region is displayed in different color lights and flashing frequencies at the border of the navigation device. Or corresponding images designed by themes of prompting, guiding, warning and the like cooperate to be displayed in an edge of the map region provided by the display module. The purpose thereof is to provide a user notices displayed on the border of the navigation device or an edge of the display module indifferent color lights representing different kinds of traffic information (such as navigation route real-time traffic information, guidance information about navigation route, information about navigation event, prompt information about navigation ending and so on) during driving, which can be received rapidly and intuitively by a corner of the user's eye. Therefore, it is unnecessary for the user to further pay too much cognitive attention on understanding or referring to the navigation images and instructions, so the driving safety can be ensured. In addition, the present disclosure also displays real-time traffic information on the border in a specific color, for example for whether a traffic event occurs on a navigation route, which makes the user clear at a glance. Further, because some information has been extended to the border, the displaying room for the navigation map can avoid being occupied so as to make the content of the displaying on the navigation screen simple and clear. The driving is therefore more safe, smooth and quick.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
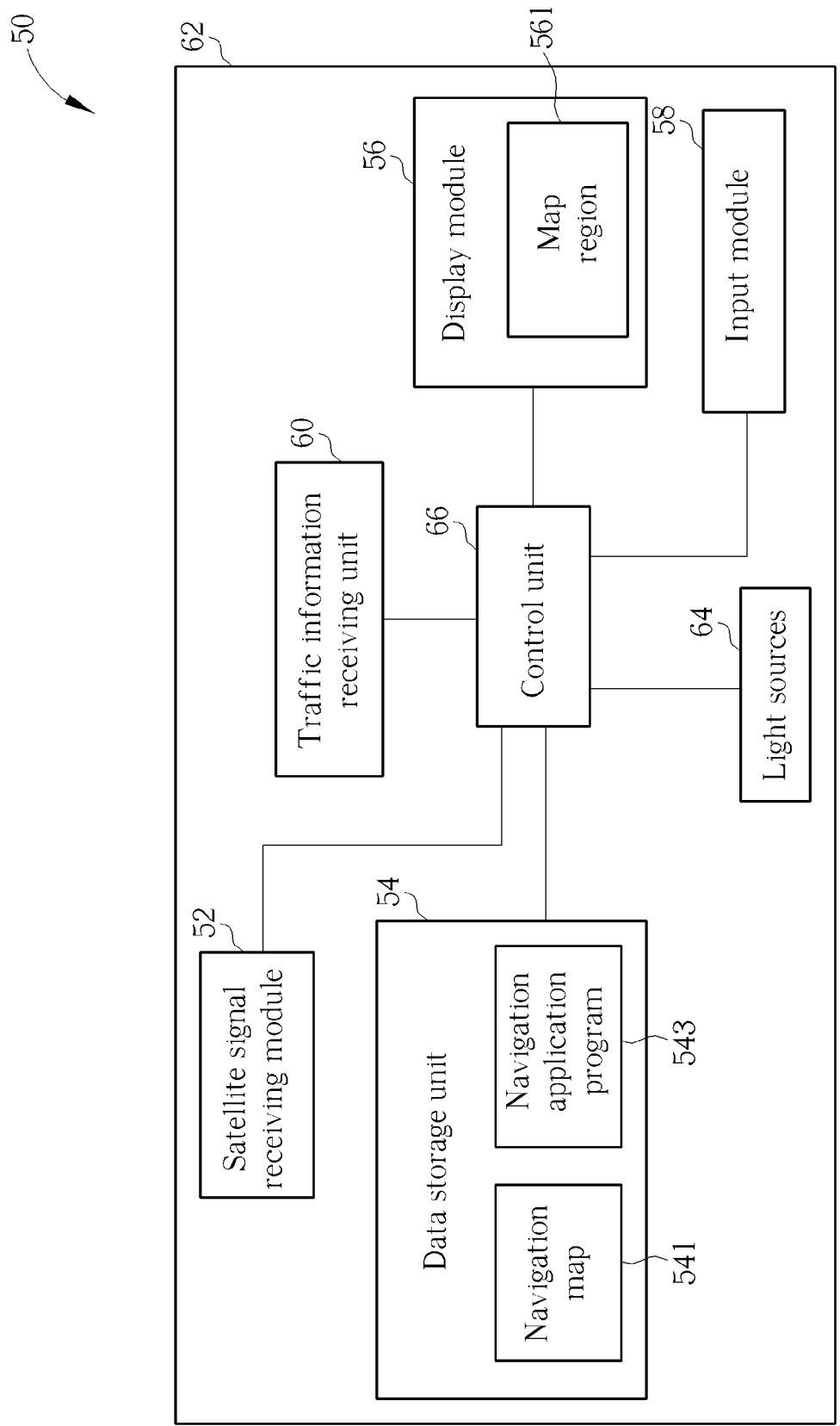
FIG. 1 is a block function diagram illustrating a navigation device of a first embodiment according to the present disclosure.
Figure 2:
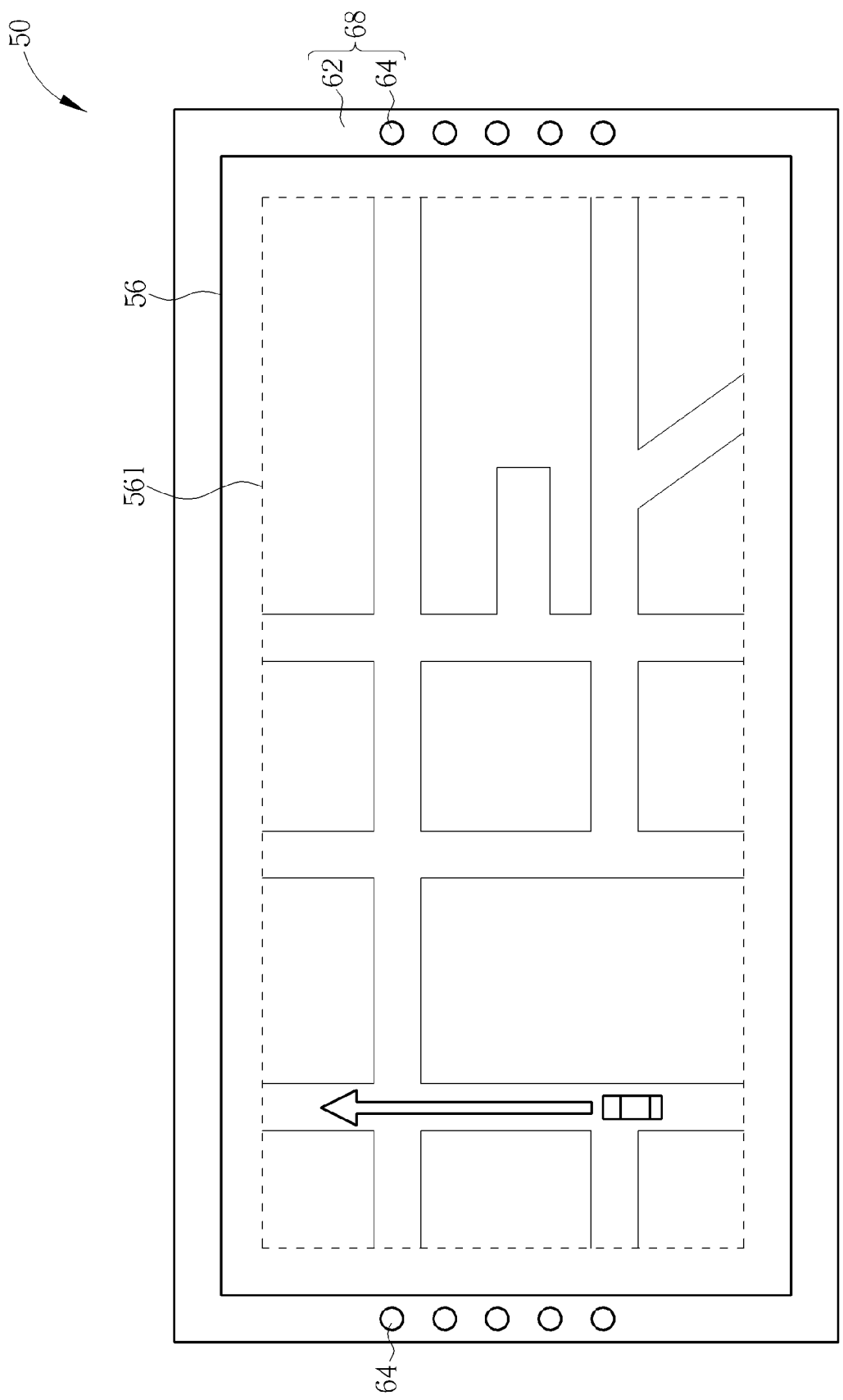
FIG. 2 is a schematic diagram respectively illustrating the navigation device of the first embodiment according to the present disclosure.

Please refer to FIG. 1 and FIG. 2, which are a block function diagram and a schematic diagram respectively illustrating a navigation device 50 of a first embodiment according to the present disclosure. The navigation device 50 can be a personal navigation device (PND) or a portable electronic device with navigation function such as smart phone, tablet computer or notebook computer. The navigation device 50 is used for presenting relational traffic information with different light effects. The navigation device 50 includes a satellite signal receiving module 52, a data storage unit 54, a display module 56, an input module 58, a traffic information receiving unit 60, a border 62, at least one light sources 64, and a control unit 66. The satellite signal receiving module 52 is used for receiving a positioning signal, for example through a global positioning system (GPS) so as to locate the navigation device 50. The data storage unit 54 is used for storing a navigation map 541 corresponding to the positioning signal and a navigation application program 543. The navigation application program 543 can produce the navigation map 541 corresponding to the positioning signal from a map database and plan a corresponding navigation route. The display module 56 is used for displaying the navigation map 541 on a map region 561. In the embodiment, a screen provided by the display module 56 can substantially correspond to the map region 561. A user can be aware of relational current navigation information by looking at the map region 561 displayed by the display module 56. For example, the relational current navigation information can be the navigation map 541, current position, navigation route, road speed limit, real-time traffic, turning notice, velocity of vehicle and so on which all provided by the navigation application program 543, and can be labeled on the navigation map 541 by numerals, letters, icons, and specific color marks. The input module 58 is used for providing the user to input operation instructions such as navigation instructions, navigation destinations, navigation modes, and soon. The input module 58 can be integrated with the display module 56 into a same module, a touch panel for example. Furthermore, the navigation device 50 can be optionally equipped with the traffic information receiving unit 60 for receiving traffic information. The traffic information can correspond to navigation route real-time traffic information, information about navigation event or the like. For example, the traffic information receiving unit 58 receives the traffic information by a radio data system-traffic Message Channel (RDS-TMC) or network transmission, so as to get public traffic resource over network such as Google Map, police RDS-TMC service, real-time highway traffic information by a highway bureau and so on.

Furthermore, the border 62 is disposed outside the display module 56 for encapsulating inner components inside the navigation device 50. The light source 64 is installed inside the border 62. The light source 64 can be a light-emitting diode component. The navigation device 50 can be provided with a plurality of the light sources 64 disposed at the different sides of the border 62. The disposition amount and position of the light sources 64 is not limited thereto but depends on practical designs. In the embodiment, a prompt region 68 is formed by a combination of the border 62 and the light source 64 and can present corresponding prompt information with different light effects. Therefore, the prompt region 68 is located outside the map region 561 of the display module 56. The control unit 66 is coupled to the satellite signal receiving module 52, the data storage unit 54, the display module 56, the input module 58, the traffic information receiving unit 60, and the light source 64 for controlling the operation of the above components. For example, the control unit 66 includes driving chips for driving the display module 56 and the light source 64 and can control the prompt region 68 for presenting prompt information by hardware, software, or firmware. Furthermore, the control unit 66 is used for controlling the display module 56 to display the corresponding navigation map 541 on the map region 561 according to the positioning signal received by the satellite signal receiving module 52 and the navigation application program 543. The control unit 66 is also used for controlling the prompt region 68 to present the corresponding prompt information with different light effects according to traffic information. Therein, the traffic information can correspond to guidance information about navigation route, information about navigation event, prompt information about navigation ending or the like and can be provided by the navigation application program 543 or received by the traffic information receiving unit 60.

Figure 3:
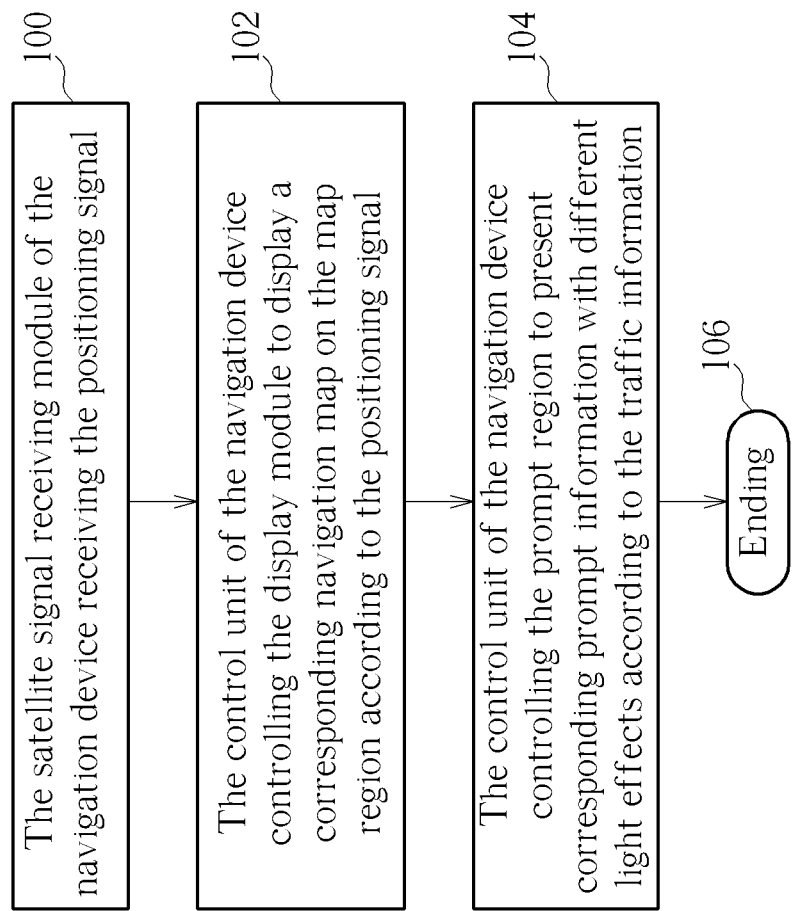
FIG. 3 is a flow chart of a method for presenting prompt information on the navigation device according to the disclosure.

Please refer to FIG. 3, which is a flow chart of a method for presenting prompt information on the navigation device 50. The method includes the following steps:

Step 100: the satellite signal receiving module 52 of the navigation device 50 receiving the positioning signal, Step 102: the control unit 66 of the navigation device 50 controlling the display module 56 to display a corresponding navigation map 541 on the map region 561 according to the positioning signal, Step 104: the control unit 66 of the navigation device 50 controlling the prompt region 68 to present corresponding prompt information with different light effects according to the traffic information, and Step 106: ending.

For further descriptions for the above steps, first, the satellite signal receiving module 52 can receives the positioning signal for example from a global navigation satellites system for positioning a current position of the navigation device 50. Then, the control unit 66 of the navigation device 50 controls the display module 56 to display the corresponding navigation map 541 on the map region 561 according to the positioning signal. During the above procedures or afterward, a user can use the input module 58 to input operation instructions such as navigation instructions, navigation destinations, navigation modes, and so on. It should be mentioned that the control unit 66 can control the prompt region 68 to present the corresponding prompt information with different light effects according to the traffic information. The traffic information can be provided by the navigation application program 543 or received by the traffic information receiving unit 60.

Figure 4:
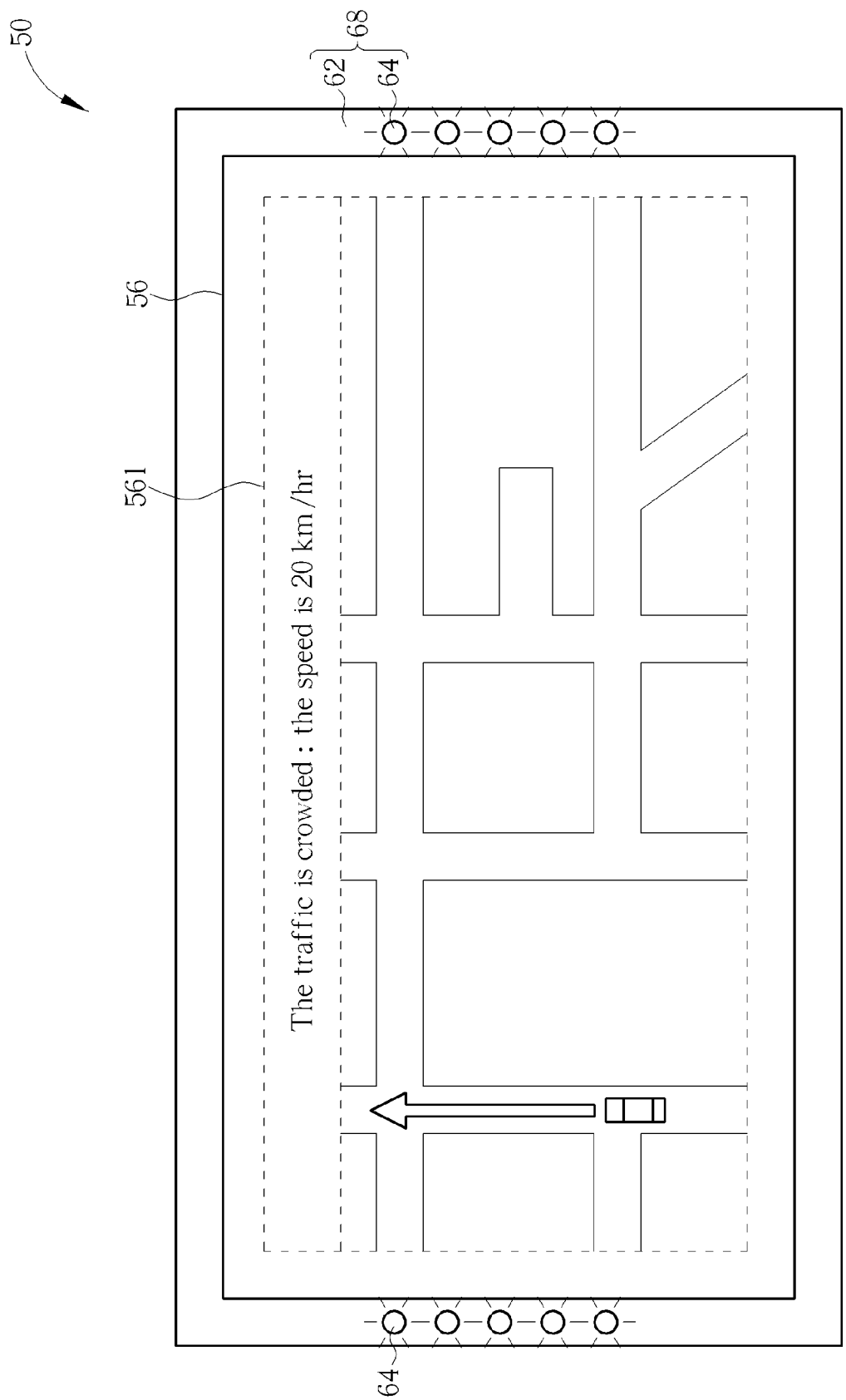
FIG. 4 is a schematic diagram illustrating the navigation device of the first embodiment according to the present disclosure presents a real-time traffic of the navigation route.

For example, the control unit 66 controls the prompt region 68 to emit light in different color lights according to the navigation route real-time traffic information received by the traffic information receiving unit 60, that is, to control the light source 64 on the border 62 in different color lights to present different real-time traffic information so as to present a real-time traffic of the navigation route. Please refer to FIG. 4, which is a schematic diagram illustrating the navigation device 50 of the first embodiment according to the present disclosure presents a real-time traffic of the navigation route. For example, when the light source 64 emits green light, the prompt region 68 presents smooth traffic; that is, the speed is allowable to be over 80 km per hour or other adjacent roads are smooth. When the light source 64 emits yellow light, the prompt region 68 presents a little crowded traffic; that is, the speed is from 40 to 79 km per hour or the speed on the other adjacent roads is slow. When the light source 64 emits red light, the prompt region 68 presents crowded traffic; that is, the speed is lower than 40 km per hour or the other adjacent roads is crowded. When the light source 64 emits dark red light, the prompt region 68 presents stop-and-go traffic; for example, the highway and the other adjacent roads are very crowded, and vehicle stop and go. The corresponding relation between the color light emitted by the prompt region 68 and the real-time traffic is not limited thereto but depends on practical designs.

Figure 5:
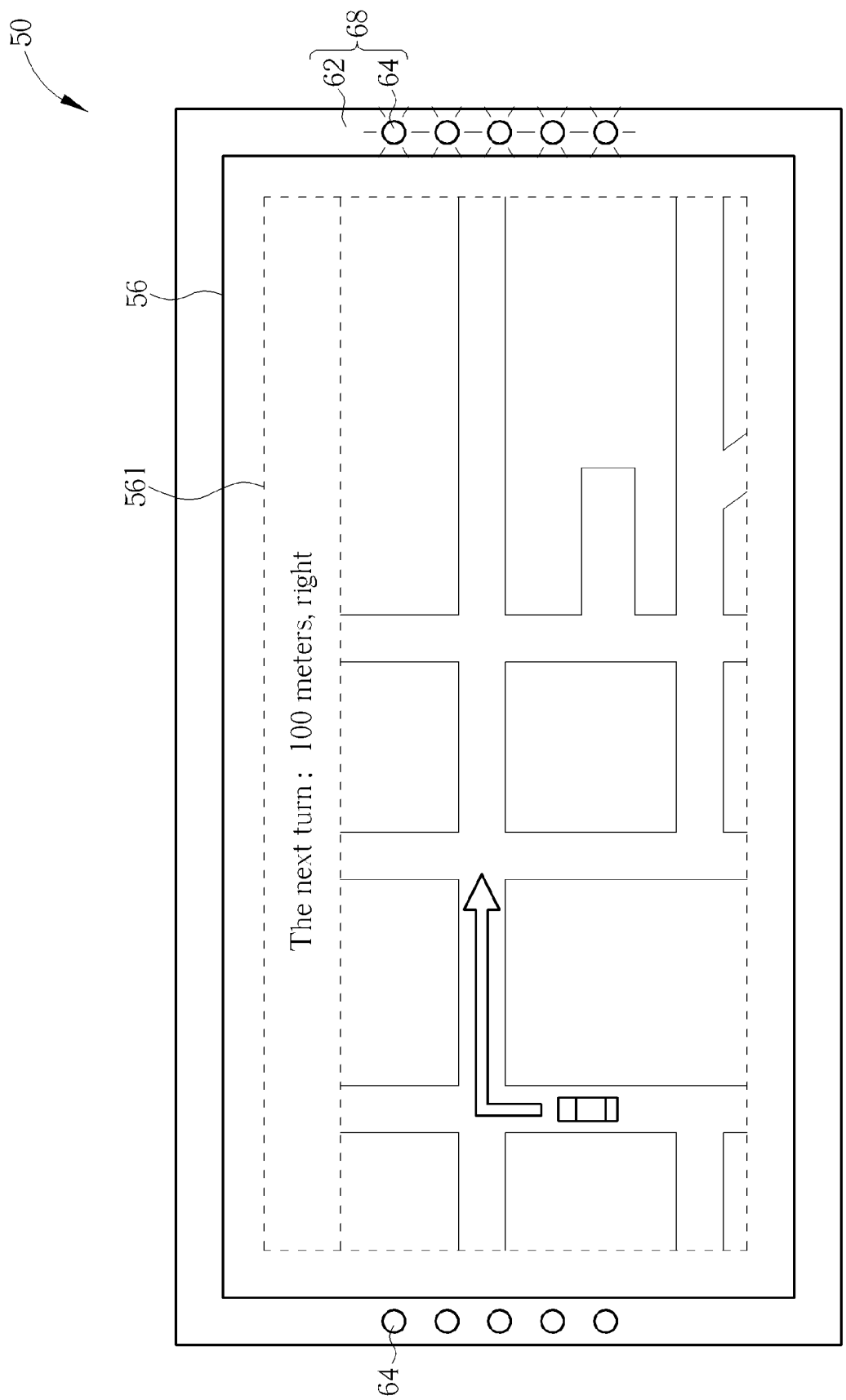
FIG. 5 is a schematic diagram illustrating the navigation device of the first embodiment according to the present disclosure presents the current position and the location of the next turn.

In another embodiment, the control unit 66 controls the prompt region 68 to emit light in different color lights, in different flashing frequencies, or in different presenting ratios according to the guidance information about navigation route provided by the navigation application program 543, so as to present a distance from a current position of the navigation device 50 to a next turn planned by a navigation route. Please refer to FIG. 5, which is a schematic diagram illustrating the navigation device 50 of the first embodiment according to the present disclosure presents the current position and the location of the next turn. For example, the distance from the current position of the navigation device 50 to the next turn can be presented by controlling the light source 64 lighting in a multi-stage change or in a flashing change. For example, the multi-stage change can be designed to be a three-stage change. If the distance from the current position to the next turn is within a range from 500 meters to 1 km, the light source 64 lights continuously, i.e. in a continuous mode. If the distance from the current position to the next turn is within a range from 100 to 500 meters, the light source 64 lights in a breathing mode (for example with switching per second). If the distance from the current position to the next turn is shorter than 100 meters, the light source 64 lights in a flashing mode (for example with switching three times per second). In practice, the switching frequency for flashing can be increased (from low frequency to high frequency) for enhancing the prompt to the user that it is getting closer and closer to the next turn and for suggesting the user to be ready for turning, for example by switching lane with turning on a turn signal and so on. Furthermore, the switching method for the breathing mode can be performed by multiplying the original RGB values (ranging from 0 to 255) by a percent for increasing or decreasing and by setting the time correspondingly for performing each cycle of lighting gradually from dark to bright and to dark. For example, the time for each cycle can be set to 1.5 seconds. In the flashing mode, the switching frequency can be set to 3 times per second (i.e. switching per 333 milliseconds); besides, the light source 64 lights (i.e. in the set RGB values) in odd times and is off (i.e. in a RGB values of zeros) in even times. In the continuous mode, the light source 64 can be triggered by an event to light in the pre-determined RGB values; afterwards, the light source 64 can be turned off (i.e. by setting the RGB values to zeros) when the event ends or be triggered by another event to change to light in a RGB color and light effect corresponding to the another event. Furthermore, the control unit 66 also can controls the prompt region 68 to emit light in different presenting positions according to the guidance information about navigation route, so as to present a turn direction of the next turn planned by the navigation route. For example, lighting from the right side of the border 62 represents the next turn is a right turn; lighting from the left side of the border 62 represents the next turn is a left turn. The corresponding relation between the color light emitted by the prompt region 68 and the guidance information about navigation route is not limited thereto but depends on practical designs.

Figure 6:
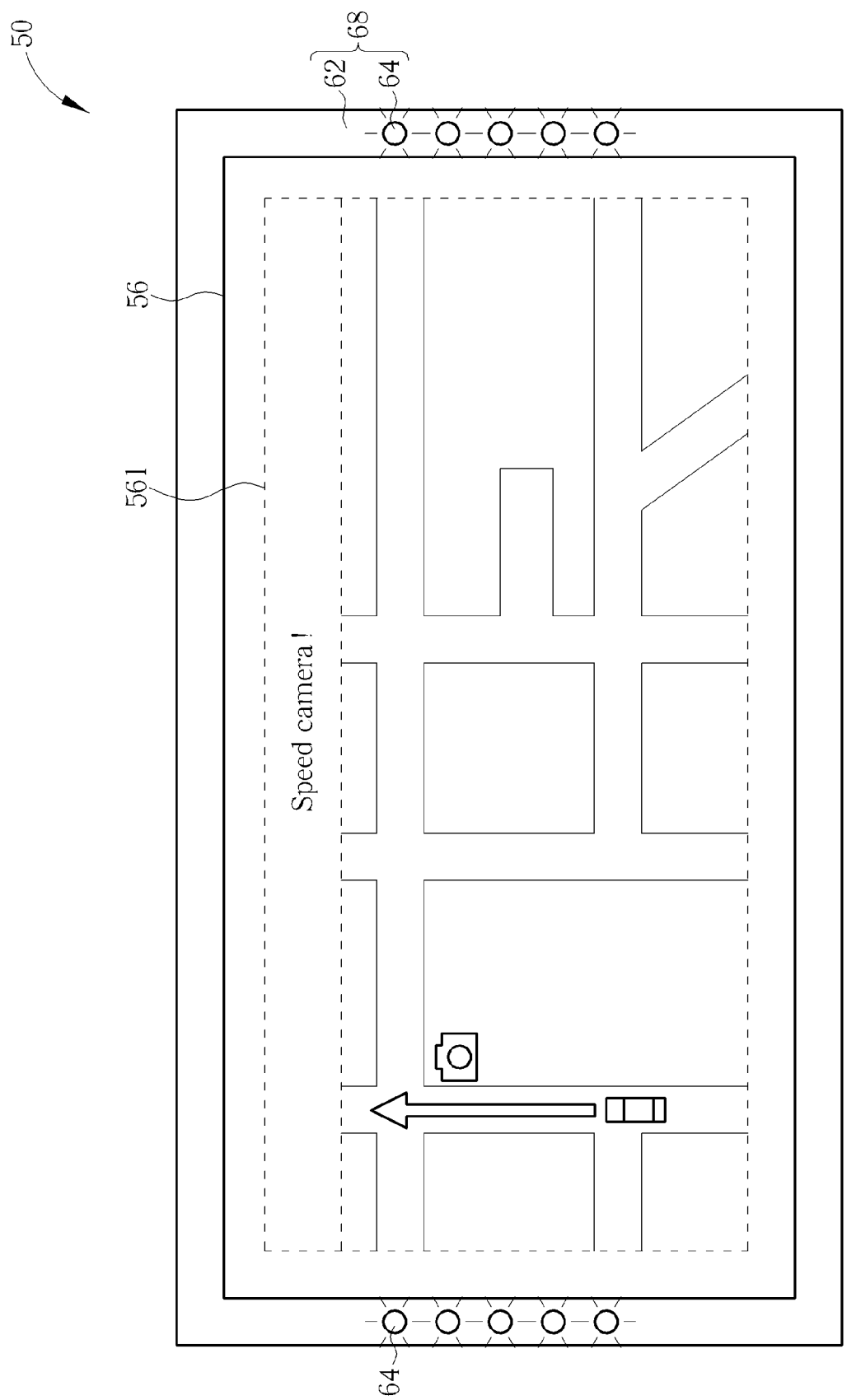
FIG. 6 is a schematic diagram illustrating the navigation device of the first embodiment according to the present disclosure presents a navigation route.

In another example, the control unit 66 also can control the prompt region 68 to emit light in a specific color light or in a specific flashing frequency according to the information about navigation event (such as speed camera event) provided by the navigation application program 543 or the information about navigation event (such as real-time traffic accident) received by the traffic information receiving unit 60, so as to present the corresponding navigation route. Please refer to FIG. 6, which is a schematic diagram illustrating the navigation device 50 of the first embodiment according to the present disclosure presents a navigation route. For example, the user can be noticed reacting in advance by the information about navigation event (such as locations of speed camera) pre-stored by the navigation application program 543 or by the information about navigation event (such as real-time traffic accident or notice for changing road) received by the traffic information receiving unit 60. For example, if the road speed limited is from 40 to 70 km per hour, the light sources 64 can be designed to flash in red light in a high frequency (e.g. 3 times per second) when the distance to a speed camera is within a range from 300 to 500 meters. If the road speed limited is from 80 to 120 km per hour, the light sources 64 can be designed to flash in red light in a high frequency (e.g. 3 times per second) when the distance to a speed camera is within a range from 1000 to 1500 meters. The corresponding relation between the color light emitted by the prompt region 68 and the information about navigation event is not limited thereto but depends on practical designs.

Figure 7:
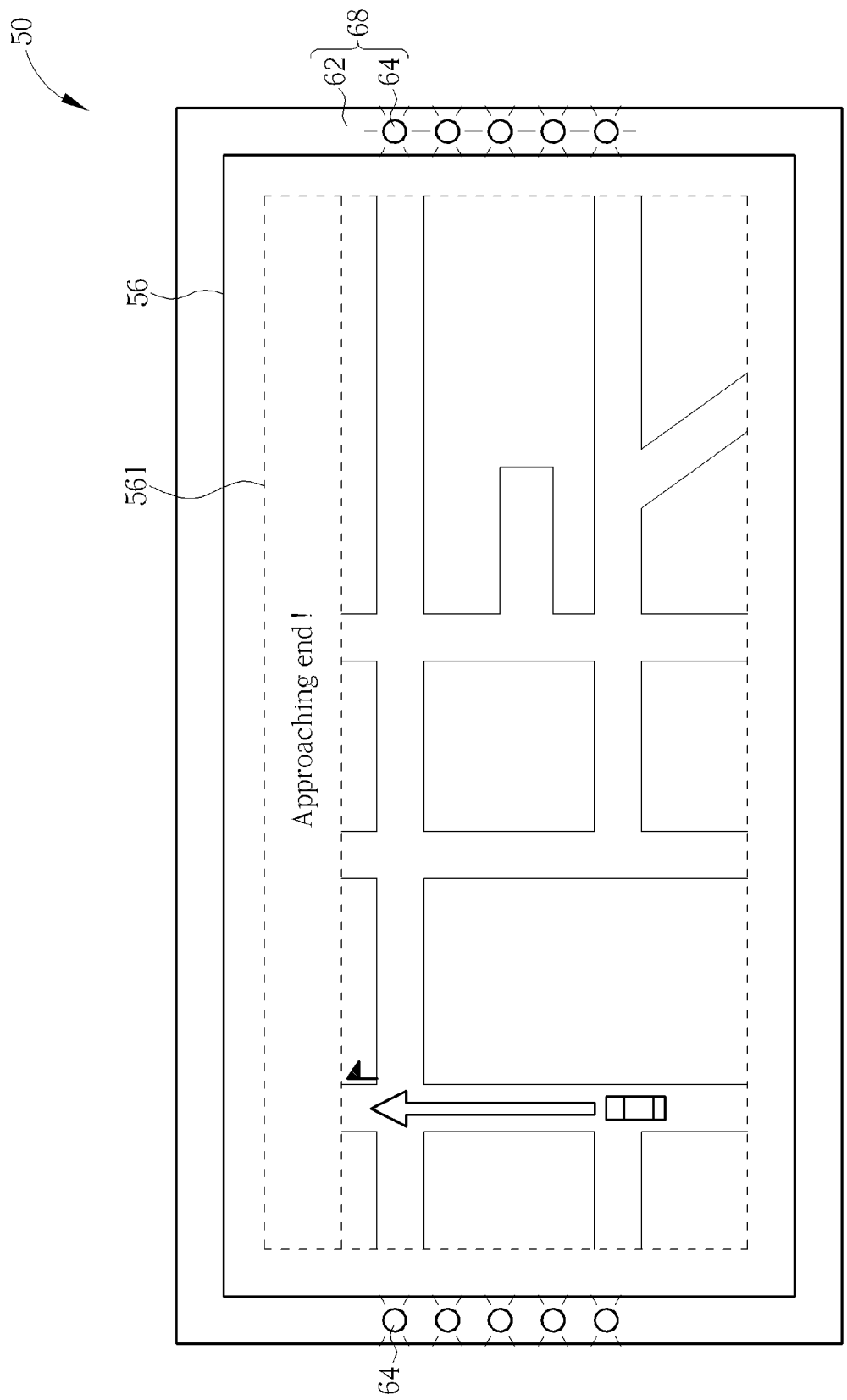
FIG. 7 is a schematic diagram illustrating the navigation device of the first embodiment according to the present disclosure approaches an end of a navigation route.

In another example, the control unit 66 also can control the prompt region 68 to emit light in a specific color light or in a specific flashing frequency according to the prompt information about navigation ending, so as to present the current position of the navigation device being close to an end of the navigation route. Please refer to FIG. 7, which is a schematic diagram illustrating the navigation device 50 of the first embodiment according to the present disclosure approaches an end of a navigation route. For example, if it is detected that the distance from the current position of the navigation device 50 to the end of the navigation route is about 300 meters, the light source 64 can be controlled to flash in a high flashing frequency (e.g. 3 times per second) in a color light with prompting effects (such as green light) for warning the user that the end of the navigation route approaches, so as to avoid an occurrence that the user is unaware of being beyond the end of the navigation route. The corresponding relation between the color light emitted by the prompt region 68 and the prompt information about navigation ending is not limited thereto but depends on practical designs.

Figure 8:
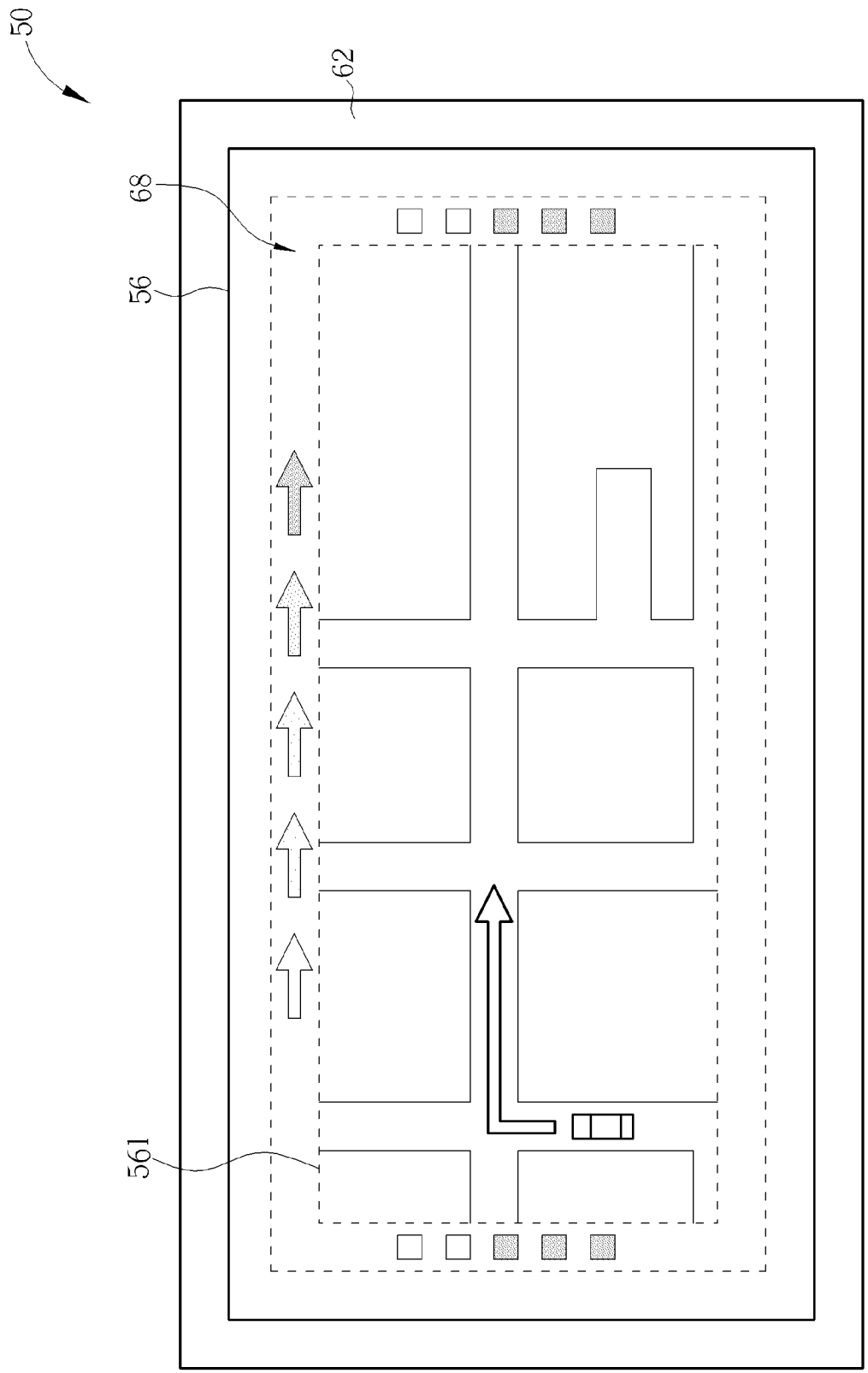
FIG. 8 is a schematic diagram illustrating the navigation device of a second embodiment according to the present disclosure presents the current position and the location of the next turn.

Further in another embodiment, the prompt region 68 can be provided by software on the display screen of the display module 56; that is, the control unit 66 can be used to control the display module 56 to display the prompt region 68 by software in an edge of the map region 561. In practice, the prompt region 68 can include the combination of the border 62 and the light source 64 and the edge of the map region 561. The design choice of the prompt region 68 depends on practical designs. For example, the control unit 66 controls the display module 56 to emit light in different color lights in the prompt region 68 in the edge of the map region 561 according to the navigation route real-time traffic information received by the traffic information receiving unit 60, so as to present the real-time traffic of the navigation route. Alternatively, the control unit 66 controls the display module 56 to emit light in different color lights on the navigation route, so as to present the real-time traffic of the navigation route; the operation principle thereof is the same as the above embodiments and will not be described in detail. In another embodiment, the control unit 66 may control the display module 56 to display the prompt region 68 in the edge of the map region 561 in different color lights, in different flashing frequencies, or in different presenting ratios according to the guidance information about navigation route provided by the navigation application program 543, so as to present a distance from the current position of the navigation device 50 to a next turn planned by the navigation route. Alternatively, the control unit 66 controls the display module 56 to emit light in different arrow directions or in different presenting positions so as to present a turn direction of the next turn of the navigation route planned by the navigation route. Please refer to FIG. 8, which is a schematic diagram illustrating the navigation device 50 of a second embodiment according to the present disclosure presents the current position and the location of the next turn. For example, the prompt region 68 displayed by the display module 56 can be controlled to emit color light with an increasing lighting area (such as from ⅓ to ⅔) and from a lower frequency to a higher frequency (such as from 2 to 4 times per second) so as to get the user be aware of the turn direction, to be ready for the turning, and a final real-time turning notice; the operation principle thereof is the same as the above embodiments and will not be described in detail.

In another example, the control unit 66 also can control the prompt region 68 of the display module 56 in the edge of the map region 561 to emit light in a specific color light or in a specific flashing frequency according to the information about navigation event (such as speed camera event) provided by the navigation application program 543 or the information about navigation event (real-time traffic accident) received by the traffic information receiving unit 60, so as to present a corresponding speed camera event; the operation principle thereof is the same as the above embodiments and will not be described in detail. In another example, the control unit 66 also can control the prompt region 68 of the display module 56 in the edge of the map region 561 to emit light in a specific color light or in a specific flashing frequency according to the prompt information about navigation ending, so as to present a current position of the navigation device 50 being close to an end of a navigation route; the operation principle thereof is the same as the above embodiments and will not be described in detail. The mechanisms of controlling by hardware or software the prompt region with different light effects for presenting corresponding prompt information for the present disclosure can be applied cooperatively. For example, the prompt region 68 formed by the border 62 and the light source 64 presents turning information in different directions or in different color light presenting ratios, or the prompt region 68 formed by the border 62 and the light source 64 presents traffic information with different color light effects. These depend on practical designs. Furthermore, the above examples for the present disclosure can be classified into individual application and integration application. For example, it is applicable to optionally integrate a few kinds of prompt information presented with different light effects by the prompt region 68 according to the navigation route real-time traffic information, the guidance information about navigation route, the information about navigation event, and the prompt information about navigation ending, which depends on practical designs.

Compared with the prior art, the present disclosure provides the navigation device and the navigation method capable of presenting prompt information with different light effects, for example by designing the prompt region on the border of the navigation device to emit light in different color lights and in different flashing frequencies or by displaying corresponding images designed by various themes of prompting, guiding, warning and the like outside the map region (e.g. on the periphery or a side of the map information) provided by the display module. The purpose thereof is to provide the user notices displayed on the border of the navigation device or the edge of the display module in different color lights representing different kinds of traffic information (such as navigation route real-time traffic information, guidance information about navigation route, information about navigation event, prompt information about navigation ending and so on) during driving, which can be received rapidly and intuitively by a corner of the user's eye. Therefore, it is unnecessary for the user to further pay too much cognitive attention on understanding or referring to the navigation images and instructions, so the driving safety can be ensured. In addition, the present disclosure also displays real-time traffic information on the border in a specific color, for example for whether a traffic event occurs on a navigation route, which makes the user clear at a glance. Further, because some information has been extended to the border, the displaying room for the navigation map can avoid being occupied so as to make the content of the displaying on the navigation screen simple and clear. The driving is therefore more safe, smooth and quick.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for presenting prompt information on a navigation device, comprising the following steps:
a satellite signal receiving module of the navigation device receiving a positioning signal;
a control unit of the navigation device controlling a display module of the navigation device to display a navigation map on a map region of the display module according to the positioning signal;
a traffic information receiving unit of the navigation device receiving traffic information, the traffic information corresponding to navigation route real-time traffic information or information about navigation event; and
the control unit of the navigation device controlling a prompt region to present prompt information with different light effects according to the traffic information, wherein the prompt region is located outside the map region.

2. The method of claim 1, wherein the traffic information further corresponds to guidance information about navigation route or prompt information about navigation ending.

3. The method of claim 2, wherein the control unit of the navigation device controlling the prompt region to present the prompt information with different light effects according to the traffic information comprises:
the control unit of the navigation device controlling the prompt region to emit light in different color lights, in different flashing frequencies, or in different presenting ratios according to the guidance information about navigation route, so as to present a distance from a current position of the navigation device to a next turn planned by a navigation route.

4. The method of claim 3, further comprising the control unit of the navigation device controlling the prompt region to emit light in different arrow directions or in different presenting positions according the guidance information about navigation route, so as to present a turn direction of a next turn planned by a navigation route.

5. The method of claim 2, wherein the control unit of the navigation device controlling the prompt region to present the prompt information with different light effects according to the traffic information comprises:

the control unit of the navigation device controlling the prompt region to emit light in a specific color light or in a specific flashing frequency according to the information about navigation event, so as to present a speed camera event.

6. The method of claim 2, wherein the control unit of the navigation device controlling the prompt region to present the prompt information with different light effects according to the traffic information comprises:

the control unit of the navigation device controlling the prompt region to emit light in a specific color light or in a specific flashing frequency according to the prompt information about navigation ending, so as to present a current position of the navigation device being close to an end of a navigation route.

7. The method of claim 1, wherein the traffic information receiving unit of the navigation device receiving the traffic information comprises:

the traffic information receiving unit of the navigation device receiving the traffic information by a radio data system-traffic message channel or by network transmission.

8. The method of claim 1, wherein the control unit of the navigation device controlling the prompt region to present the prompt information with different light effects according to the traffic information comprises:

the control unit of the navigation device controlling the prompt region to emit light in different color lights according to the navigation route real-time traffic information, so as to present a real-time traffic of a navigation route.

9. The method of claim 1, wherein the control unit of the navigation device controlling the prompt region to present the prompt information with different light effects according to the traffic information comprises:

the control unit of the navigation device controlling the prompt region to emit light in a specific color light or in a specific flashing frequency according to the information about navigation event, so as to present a real-time traffic accident.

10. The method of claim 1, wherein the control unit of the navigation device controlling the prompt region to present the prompt information with different light effects according to the traffic information comprises:

the control unit of the navigation device controlling by hardware the prompt region, located on a border of the navigation device outside the display module, to present the prompt information with different light effects according to the traffic information.

11. The method of claim 1, wherein the control unit of the navigation device controlling the prompt region to present the prompt information with different light effects according to the traffic information comprises:

the control unit of the navigation device controlling the display module to display the prompt region by software in an edge of the map region to present the prompt information with different light effects according to the traffic information.

12. A navigation device capable of presenting prompt information with different light effects, comprising:

a satellite signal receiving module, for receiving a positioning signal;

a data storage unit, for storing a navigation application program and a navigation map corresponding to the positioning signal;

a display module, for displaying the navigation map on a map region;

a prompt region, located outside the map region for presenting prompt information with different light effects;

a traffic information receiving unit for receiving traffic information, the traffic information corresponding to navigation route real-time traffic information or information about navigation event; and a control unit, coupled to the satellite signal receiving module, the data storage unit, the display module, the prompt region and the traffic information receiving unit, the control unit being used for controlling the display module to display the navigation map on the map region according to the positioning signal received by the satellite signal receiving module and the navigation application program and for controlling the prompt region to present the prompt information with different light effects according to the traffic information.

13. The navigation device of claim 12, wherein the traffic information further corresponds to guidance information about navigation route or prompt information about navigation ending.

14. The navigation device of claim 13, wherein the control unit is used for controlling the prompt region to emit light in different color lights, in different flashing frequencies, or in different presenting ratios according to the guidance information about navigation route, so as to present a distance from a current position of the navigation device to a next turn of a navigation route planned by the navigation application program.

15. The navigation device of claim 14, wherein the control unit is used for controlling the prompt region to emit light in different arrow directions or in different presenting positions according the guidance information about navigation route, so as to present a turn direction of a next turn of a navigation route planned by the navigation application program.

16. The navigation device of claim 13, wherein the control unit is used for controlling the prompt region to emit light in a specific color light or in a specific flashing frequency according to the information about navigation event, so as to present a speed camera event provided by the navigation application program.

17. The navigation device of claim 13, wherein the control unit is used for controlling the prompt region to emit light in a specific color light or in a specific flashing frequency according to the prompt information about navigation ending, so as to present a current position of the navigation device being close to an end of a navigation route by the navigation application program.

18. The navigation device of claim 12, wherein the traffic information receiving unit receives the traffic information comprises by a radio data system - traffic message channel or by network transmission.

19. The navigation device of claim 12, wherein the control unit is used for controlling the prompt region to present the prompt information with different light effects according to the navigation route real-time traffic information, so as to present a real-time traffic of a navigation route planned by the navigation application program.

20. The navigation device of claim 12, wherein the control unit is used for controlling the prompt region to emit light in a specific color light or in a specific flashing frequency according to the information about navigation event, so as to present a real-time traffic accident.

21. The navigation device of claim 12, further comprising:
a border, disposed outside the display module; and at least one light source, installed in the border and coupled to the control unit for forming the prompt region, the control unit controlling the at least one light source to present the prompt information with different light effects.

22. The navigation device of claim 12, wherein the control unit is used for controlling the display module to display the prompt region by software in an edge of the map region.

\* \* \* \* \*